C. BIKEL and J.F. LEIBOLD
GRAIN DROPPER.

No. 118,331. Patented Aug. 22, 1871.

Witnesses.
Villetto Anderson
F. B. Curtis

Inventor.
C. Bickel,
J. F. Leibold,
Chipman Hosmer & Co.
Attys.

UNITED STATES PATENT OFFICE.

CHRISTIAN BICKEL AND JACOB F. LEIBOLD, OF DELAWARE, OHIO.

IMPROVEMENT IN HARVESTER-DROPPERS.

Specification forming part of Letters Patent No. 118,331, dated August 22, 1871.

*To all whom it may concern:*

Be it known that we, CHRISTIAN BICKEL and JACOB F. LEIBOLD, of Delaware, in the county of Delaware and State of Ohio, have invented a new and valuable Improvement in Grain-Droppers; and we do hereby declare that the following is a full, clear, and exact description of the construction and operation of the same, reference being had to the annexed drawing making a part of this specification, and to the letters and figures of reference marked thereon.

Figure 1:
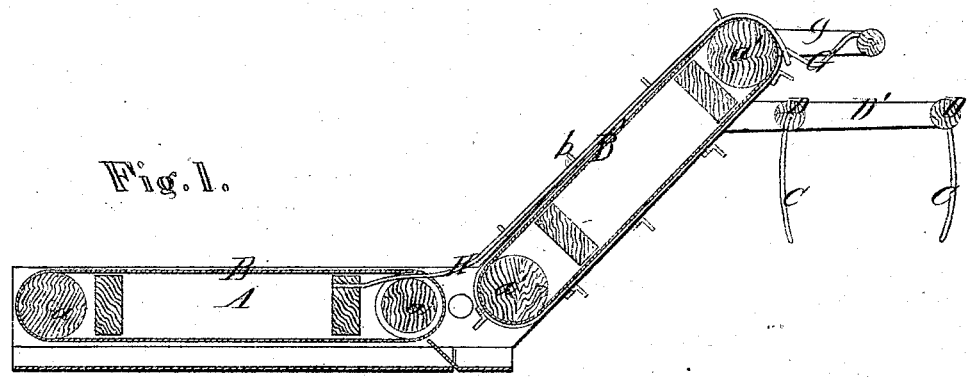
Figure 2:
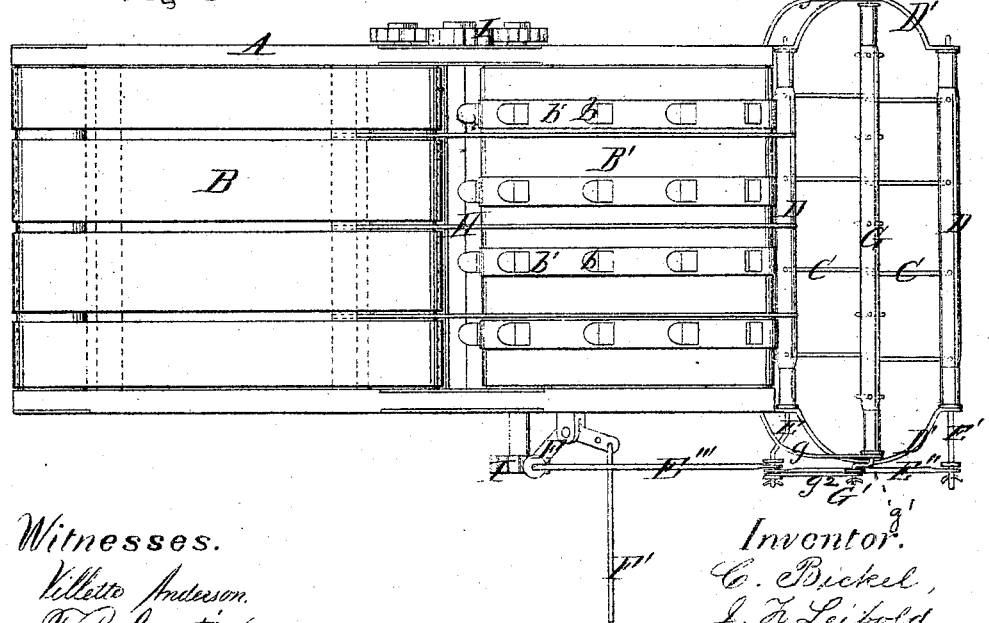

Figure 1 of the drawing is a representation of a vertical longitudinal section. Fig. 2 is a plan view.

This invention has relation to grain-droppers to be attached to harvesters; and consists in the application, in connection with a grain-carrier, of a novel and improved gaveling device, adapted to receive the cut grain in quantities sufficient to constitute a bundle for binding, and to then drop it on the ground.

In the accompanying drawing, A represents a frame, arranged behind the sickle-bar of a harvesting-machine, and provided with the cylindrical rollers $a$ $a'$, over which move the endless carriers B B', the latter being inclined, as shown in Fig. 1. Projecting from the outer surface of the latter is a series of teeth or tines, $b$, arranged in horizontal rows and attached to straps $b'$, which run lengthwise of said carrier. These teeth are for the purpose of catching and holding the grain which the carrier B' takes from B to convey it to the gaveling device. The latter consists of a pair of racks, C, the heads of which D are supported by brackets D' projecting back from the inclined part of the frame A. The bars are curved, and may be brought together to form a trough for receiving the grain that falls from the apron or carrier B'. E E' represent cranks, into which the spindles on one end of the rack-heads D are formed and connected by an arm, E''. E''' is another arm, coupling one of these cranks with an elbow-lever, F, which is actuated by a rod, F', within reach of an attendant. G is a rack with bent tines, and supported by arms $g$ above the middle of the trough formed by the racks C. It has also a crank, $g^1$, at one end, coupled by a rod, $g^2$, with the crank E. H designates metallic bars, the lower ends of which rest in grooves on the roller $a$ nearest the carrier B'; they thence extend over the surface of said carrier, and have their upper ends turned down over the upper roller $a'$. These bars serve to keep the grain from falling between the two carriers and allow it to fall off the inclined carrier into the gaveling-trough. I represents gearing, by which motion is given to the carriers from the harvester.

The operation of this invention is as follows: The cut grain falling on the carrier B is conveyed back and up the inclined carrier B', from which it falls into the trough formed by the racks C. When sufficient has accumulated to form a bundle the trough is thrown open by the rod F', which actuates the lever F, and the gavel dropped to the ground. At the same time the rack G is turned up, so that it may receive the grain which falls from the carrier while the trough is open. The trough is then closed again, and ready for the next gavel.

We claim as our invention—

The gaveling devices herein described, consisting of the center dropping-racks C C with their cranks E E', the concave waste-rack G with its crank, the connecting-rods E'' E''' $g^2$, and the elbow-lever F, substantially as specified.

In testimony that we claim the above we have hereunto subscribed our names in the presence of two witnesses.

CHRISTIAN BICKEL.
JACOB F. LEIBOLD.

Witnesses:
J. HIPPLE,
JOHN S. JONES.